United States Patent
Kristof

(10) Patent No.: US 11,299,053 B2
(45) Date of Patent: Apr. 12, 2022

(54) METHOD AND APPARATUS FOR CHARGING AN ELECTRIC VEHICLE USING A CHARGING CABLE

(71) Applicant: Dr. Ing. h.c. F. Porsche Aktiengesellschaft, Stuttgart (DE)

(72) Inventor: Thomas Kristof, Karlsruhe (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 154 days.

(21) Appl. No.: 16/869,493

(22) Filed: May 7, 2020

(65) Prior Publication Data

US 2020/0353828 A1 Nov. 12, 2020

(30) Foreign Application Priority Data

May 7, 2019 (DE) ...................... 10 2019 111 785.2

(51) Int. Cl.
*B60L 53/18* (2019.01)
*B60L 53/62* (2019.01)
*B60L 53/20* (2019.01)
*H02J 7/00* (2006.01)
*B60L 53/65* (2019.01)
*H02J 7/34* (2006.01)
*B60L 53/14* (2019.01)
*B60L 53/10* (2019.01)
*B60L 53/66* (2019.01)
*B60L 53/31* (2019.01)

(52) U.S. Cl.
CPC .............. *B60L 53/18* (2019.02); *B60L 53/11* (2019.02); *B60L 53/14* (2019.02); *B60L 53/20* (2019.02); *B60L 53/62* (2019.02); *B60L 53/65* (2019.02); *B60L 53/66* (2019.02); *H02J 7/00034* (2020.01); *H02J 7/0045* (2013.01); *H02J 7/342* (2020.01); *B60L 53/31* (2019.02); *H02J 2207/20* (2020.01)

(58) Field of Classification Search
CPC .......... B60L 53/18; B60L 53/11; B60L 53/14; B60L 53/20; B60L 53/62; B60L 53/65; B60L 53/66; B60L 53/31; H02J 7/00034; H02J 7/0045; H02J 7/342; H02J 2207/20
USPC ........................................................ 320/109
See application file for complete search history.

(56) References Cited

U.S. PATENT DOCUMENTS

2012/0253715 A1 10/2012 Ohtomo
2014/0021916 A1* 1/2014 Bilezikjian ........... H02J 7/0027
                                                                320/109

(Continued)

*Primary Examiner* — Richard Isla
*Assistant Examiner* — Manuel Hernandez
(74) *Attorney, Agent, or Firm* — Gerald E. Hespos; Michael J. Porco; Matthew T. Hespos

(57) ABSTRACT

A method and an apparatus (100) use a charging cable (108) for charging an electric vehicle. The apparatus has a first voltage converter (110) to transform a charging voltage applied to the charging cable (108) to a high voltage for a high-voltage battery (104) of the electric vehicle. The apparatus (100) also has a second two-level voltage converter (112) to charge a low-voltage battery (106) of the electric vehicle by transforming the high voltage to an intermediate voltage for an intermediate circuit (118) and transforming the intermediate voltage to a low voltage for the low-voltage battery (106). The intermediate circuit (118) is designed to precharge the charging cable (108) using the intermediate voltage before the beginning of a charging process.

8 Claims, 1 Drawing Sheet

(56) References Cited

U.S. PATENT DOCUMENTS

2016/0229298 A1* 8/2016 Chen ................ B60L 50/50
2018/0334044 A1* 11/2018 Jang ................ H02J 7/02

* cited by examiner

METHOD AND APPARATUS FOR CHARGING AN ELECTRIC VEHICLE USING A CHARGING CABLE

CROSS REFERENCE TO RELATED APPLICATION

This application claims priority under 35 USC 119 to German Patent Appl. No. 10 2019 111 785.2 filed on May 7, 2019, the entire disclosure of which is incorporated herein by reference.

BACKGROUND

Field of the Invention

The invention relates to a method and an apparatus for charging an electric vehicle using a charging cable.

Related Art

US 2012/0253715 A1 discloses aspects of charging an electric vehicle.

It is desirable to further improve the charging of electric vehicles.

SUMMARY

An electric vehicle can be charged by applying a charging voltage to a charging cable. A first voltage converter converts the charging voltage to a high voltage for a high-voltage battery of the electric vehicle. On the other hand, a second voltage converter converts the high voltage to a low voltage for charging a low-voltage battery. More particularly, the high voltage is transformed in the second voltage converter to an intermediate voltage, and the intermediate voltage is transformed to the low voltage. The charging cable is precharged using the intermediate voltage before the beginning of a charging process.

To charge an electric vehicle with direct current, referred to in the following text as DC, the voltage of the charging cable must be matched to the voltage of the electric vehicle before the charging process can begin.

Conventional charging cables have a low capacitance, and therefore these charging cables can be connected to charging relays of the electric vehicle to directly couple the charging cable in this way to the high-voltage battery of the electric vehicle. The charging cable then has the voltage of the high-voltage battery and the DC charging can begin. Battery-electric electric vehicles with a high-voltage battery also have a voltage converter for supplying a low-voltage system or a low-voltage battery. Low-voltage systems use, for example, 12 volts. In general, the voltage converter is a two-level converter with an intermediate circuit. Provision may be made for the voltage of the intermediate circuit to be able to be set actively depending on the operating point.

An 800 volt high-voltage battery in an electric vehicle cannot be charged directly at a 400 volt charging column. For this case, a unidirectional voltage converter is installed in the electric vehicle, and the voltage converter doubles the voltage of the charging column to charge the high-voltage battery in this way. In this case, there is no direct connection between the charging cable and the high-voltage battery. Therefore, the high-voltage battery cannot be connected directly to the charging cable for the charging of the charging cable. In a conventional implementation, the voltage converter used for charging has an additional precharging circuit that can precharge the charging cable to half of the high voltage at the start of charging.

The separate precharging circuit must be as small as possible due to limited installation space, costs and weight. As a result, only a limited power can be provided for precharging the charging cable. This limited precharging power is not sufficient for charging at all conventional charging columns.

In contrast, the intermediate circuit voltage of an 800 volt to 12 volt converter can be set to the value to which the charging cable has to be precharged. If the intermediate circuit is connected to the charging cable, the charging cable therefore has the voltage required to start the charging process. It is possible to omit a separate precharging circuit through the use of already existing components. The power that can be used for precharging is approximately 100 times higher compared to the separate precharging circuit.

Provision may be made to prevent a reverse flow of current through the first voltage converter and the second voltage converter into the charging cable. Thus, a return flow of current from the charging cable into the intermediate circuit is prevented at least in the charging process. The first voltage converter and the second voltage converter are designed to be unidirectional only for charging the batteries. There is no flow of current from the high-voltage battery to the charging cable. There also is no flow of current from the low-voltage battery to the high-voltage battery. The intermediate circuit additionally is designed to charge the charging cable so that a flow of current from the intermediate circuit to the charging cable is possible under certain conditions. Feeding the charging voltage from the charging cable into the intermediate circuit, that is to say a flow of current from the charging cable to the intermediate circuit, is prevented by a diode. As a result, the charging cable is charged with a high power from the intermediate circuit before the beginning of the charging process, and there is no reverse flow from the charging cable.

The charging cable that is connected to the electric vehicle may be connected electrically to the intermediate circuit to precharge the charging cable. Thus, charging the electric vehicle is started when the charging cable is precharged. This makes it possible to reliably precharge the charging cable and to reliably charge the electric vehicle.

The intermediate voltage nay be set depending on information about a charging voltage that is provided by a charging column. This enables flexible adjustment to charging columns with different charging voltages.

An apparatus for charging an electric vehicle using a charging cable comprises a first voltage converter that transforms a charging voltage that is applied to the charging cable to a high voltage for a high-voltage battery of the electric vehicle. The apparatus comprises a second, in particular two-level, voltage converter to charge a low-voltage battery of the electric vehicle, and to transform the high voltage to a low voltage for the low-voltage battery. The second voltage converter is configured to transform the high voltage for an intermediate circuit to an intermediate voltage and further is designed to transform the intermediate voltage to the low voltage. The intermediate circuit is designed to precharge the charging cable using the intermediate voltage before the beginning of a charging process. As a result, no separate components are necessary for the required precharging of the charging cable.

The first voltage converter and the second voltage converter may have means that prevent a reverse flow of current through the first voltage converter and the second voltage converter into the charging cable. The apparatus also may have means that prevents a reverse flow of current from the charging cable into the intermediate circuit at least in the charging process. The first voltage converter and the second voltage converter may be unidirectional only for charging the batteries. A flow of current from the charging cable to the intermediate circuit is prevented, in particular, by a diode.

The apparatus also may have an electrical connection, by way of which the charging cable, which is connected to the electric vehicle, is electrically connected to the intermediate circuit to precharge the charging cable. The apparatus may have a switching device that is designed to start the charging of the electric vehicle when the charging cable is precharged. As a result, the charging cable is charged reliably to the required voltage level before the charging begins.

The apparatus may be designed to set the intermediate voltage depending on information about a charging voltage that is provided by a charging column. The second voltage converter comprises, for example, first and second converters that can be set in a manner matching thereto. Therefore, the charging cable is reliably able to be set for charging columns with different charging voltages.

Further advantageous embodiments emerge from the following description and the drawing.

DETAILED DESCRIPTION

Figure 1:
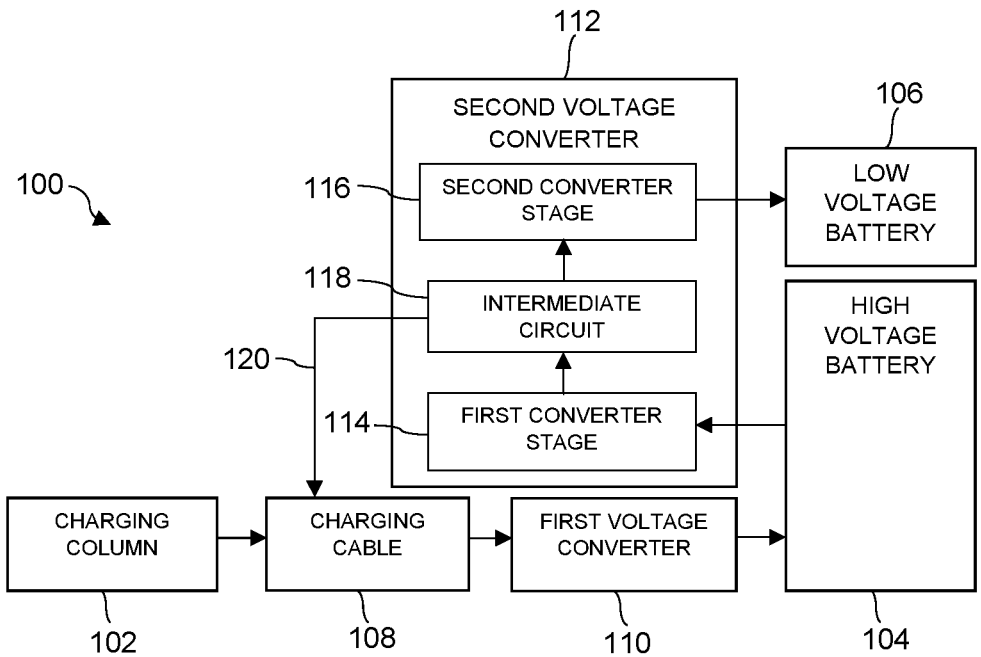
FIG. 1 is a schematic illustration of parts of an apparatus for charging an electric vehicle.

FIG. 1 shows parts of an apparatus 100 for charging an electric vehicle at a charging column 102. In the example, the charging column 102 provides charging at 400 volts.

The electric vehicle comprises a high-voltage battery 104 and a low-voltage battery 106. The high-voltage battery 104 has a high-voltage of 800 volts, the low-voltage battery 106 has a low voltage of 12 volts. The voltages can be selected to be different. Instead of the low-voltage battery 106, a supply of a low-voltage on-board power supply system of the electric vehicle with the low-voltage can also be provided.

The electric vehicle is charged by a charging cable 108 that connects the charging column 102 and the electric vehicle for charging.

A charging voltage, in this example 400 volts, that is applied to the charging cable 108, is transformed in the electric vehicle by a first voltage converter 110 to the high voltage, in this example 800 volts. The first voltage converter 110 is unidirectional, that means there is no flow of current from the first voltage converter 110 back into the charging cable 108.

A second, in particular two-level, voltage converter 112 is designed to charge the low-voltage battery 106 and to transform the high voltage to the low voltage.

The second voltage converter 112 comprises a first converter stage 114 and a second converter stage 116. The first converter stage 114 is designed to transform the high voltage to an intermediate voltage. The second converter stage 116 is designed to transform the intermediate voltage to the low voltage. More precisely, in the example, the high voltage of 800 volts is transformed to an intermediate voltage of 400 volts and the intermediate voltage of 400 volts is transformed to the low voltage of 12 volts. In the example, the converter stages are unidirectional, that is to say there is no flow of current from the low-voltage battery 106 to the high-voltage battery 104. The first voltage converter 110 and the second voltage converter 112 have means that prevent a reverse flow of current through the first voltage converter 110 and the second voltage converter 112 into the charging cable 108.

An intermediate circuit 118 is between the first converter stage 114 and the second converter stage 116. The intermediate circuit is designed to precharge the charging cable 108 with the intermediate voltage before beginning a charging process.

The apparatus optionally is designed to set the intermediate voltage depending on information about a charging voltage provided by a charging column connected to the electric vehicle having the charging cable to be charged.

The intermediate circuit 118 has means to prevents a reverse flow of current from the charging cable 108 into the intermediate circuit 118 at least in the charging process. A flow of current from the charging cable 108 to the intermediate circuit 118 is prevented, in particular, by a diode.

The apparatus 100 has an electrical connection 120, by way of which the charging cable 108 connected to the electric vehicle is connected electrically to the intermediate circuit 118 to precharge the charging cable 108. The apparatus 100 may have a switching device to start the charging of the electric vehicle when the charging cable 108 is precharged. The switching device may comprise a voltage measurement device designed to measure the voltage of the charging cable 108 and to compare it with a threshold value. The voltage measurement device is designed in this case to start the charging when the measured voltage exceeds the threshold value.

Figure 2:
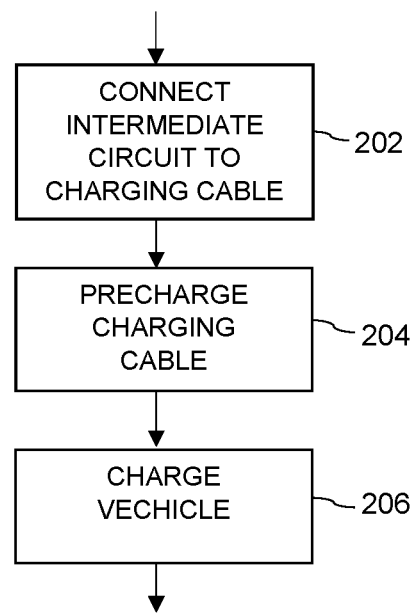
FIG. 2 shows steps in a method for charging an electric vehicle.

A method for charging the electric vehicle is described in the following text with reference to FIG. 2.

The method for charging the electric vehicle using the charging cable 108 begins when the charging cable 108 is connected to the electric vehicle.

In a step 202, the intermediate circuit 118 is connected electrically to the charging cable 108.

The charging cable 108 is precharged in a step 204. The high voltage from the high-voltage battery 104 is transformed in the second voltage converter 112 to the intermediate voltage. The charging cable 108 is precharged using the intermediate voltage before the beginning of a charging process. As a result, an intermediate circuit 118 in the charging system of the electric vehicle anyway is used; separate components for the necessary precharging of the charging cable 108 are omitted.

The intermediate voltage optionally is set depending on information about a charging voltage that is provided by the connected charging column 102.

The charging of the electric vehicle is started in a step 206 when the charging cable 108 is precharged.

The charging voltage applied to the charging cable 108 is transformed by the first voltage converter 110 to the high voltage for the high-voltage battery 104 of the electric vehicle.

To charge the low-voltage battery 106 of the electric vehicle, the high voltage is transformed by the second voltage converter 112 to the low voltage for the low-voltage battery 106.

The high voltage is transformed in the second voltage converter 112 to the intermediate voltage. The intermediate voltage is transformed to the low voltage.

A reverse flow of current through the first voltage converter 110 and the second voltage converter 112 into the charging cable 108 is prevented. A reverse flow of current from the charging cable 108 into the intermediate circuit 118 is prevented at least in the charging process.

What is claimed is:

1. An apparatus for charging an electric vehicle using a charging cable, the apparatus comprising: a first voltage converter designed to transform a charging voltage applied to the charging cable to a high voltage for charging a high-voltage battery of the electric vehicle; a second, two-level, voltage converter designed to transform the high voltage of the high-voltage battery to an intermediate voltage for an intermediate circuit and to transform the intermediate voltage to a low voltage for a low-voltage battery, and wherein the intermediate circuit is designed to precharge the charging cable using the intermediate voltage before beginning a charging process.

2. The apparatus of claim 1, wherein the first voltage converter and the second voltage converter have means that prevent a reverse flow of current through the first voltage converter and the second voltage converter into the charging cable, and wherein the apparatus further has a means that prevents a reverse flow of current from the charging cable into the intermediate circuit at least in the charging process.

3. The apparatus of claim 1, further comprising an electrical connection, by way of which the charging cable, which is connected to the electric vehicle, is electrically connected to the intermediate circuit to precharge the charging cable, wherein the apparatus has a switching device to start the charging of the electric vehicle when the charging cable is precharged.

4. The apparatus of claim 1, wherein the apparatus is designed to set the intermediate voltage depending on information about a charging voltage provided by a charging column.

5. A method for charging an electric vehicle using a charging cable, comprising: charging a high-voltage battery of the electric vehicle by using a first voltage converter for transforming a charging voltage applied to the charging cable to a high voltage for charging the high-voltage battery of the electric vehicle, and charging a low-voltage battery of the electric vehicle by using a second two-level voltage converter for first transforming the high voltage of the high-voltage battery to an intermediate voltage and then transforming the intermediate voltage to the low voltage, and precharging the charging cable using the intermediate voltage before beginning a charging process.

6. The method of claim 5, further comprising preventing a reverse flow of current through the first voltage converter and the second voltage converter into the charging cable, and preventing a return flow of current from the charging cable into the intermediate circuit at least in the charging process.

7. The method of claim 6, further comprising electrically connecting to the intermediate circuit the charging cable that is connected to the electric vehicle for precharging the charging cable, and starting the charging of the electric vehicle after the charging cable is precharged.

8. The method of claim 5, further comprising setting the intermediate voltage depending on information about a charging voltage provided by a charging column.

\* \* \* \* \*